Dec. 1, 1936. O. H. ENSIGN 2,062,644
INJECTION ENGINE AND FUEL INJECTION DEVICE
Filed June 9, 1931 4 Sheets-Sheet 1
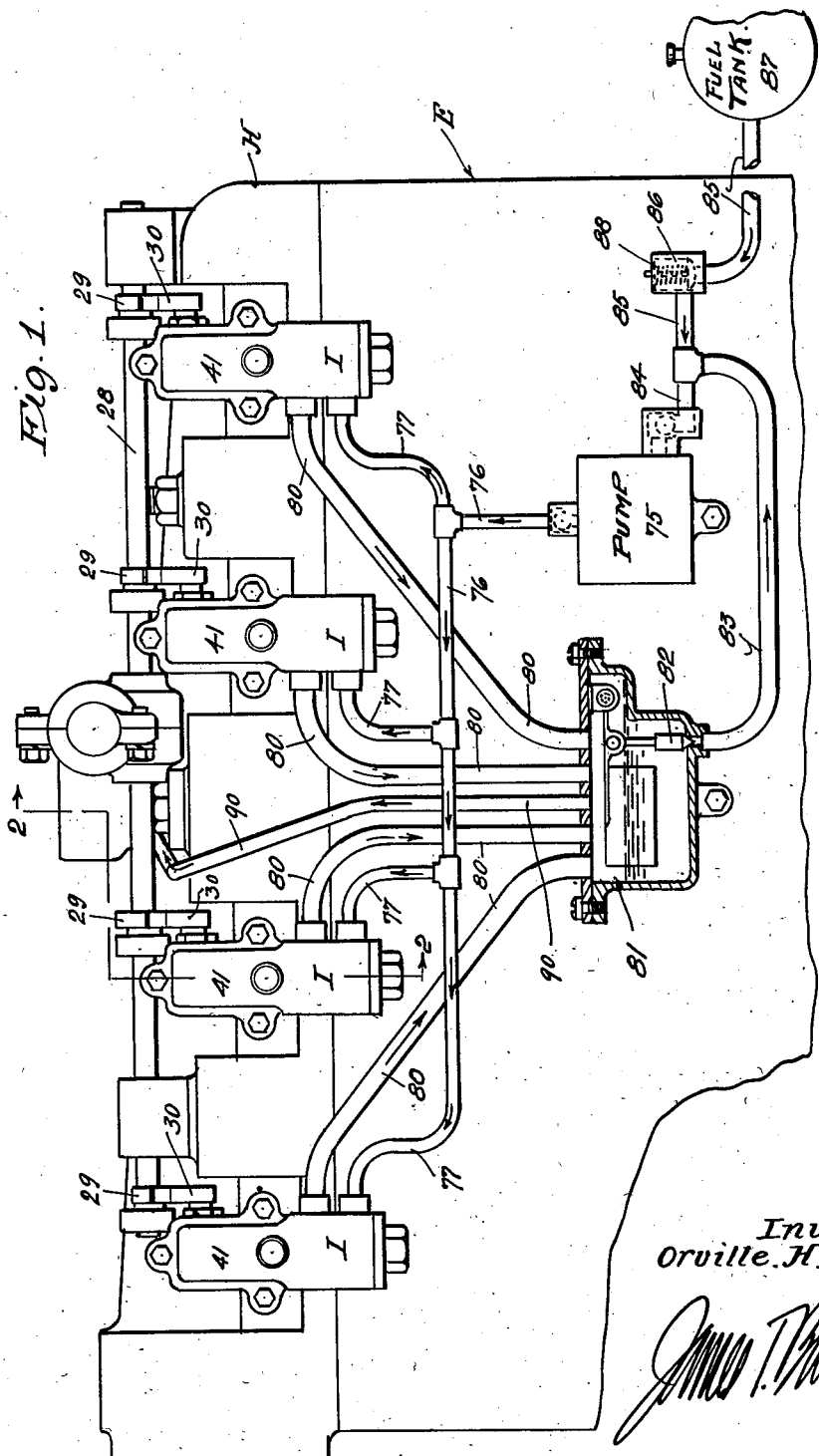
Inventor.
Orville H. Ensign
Attorney.

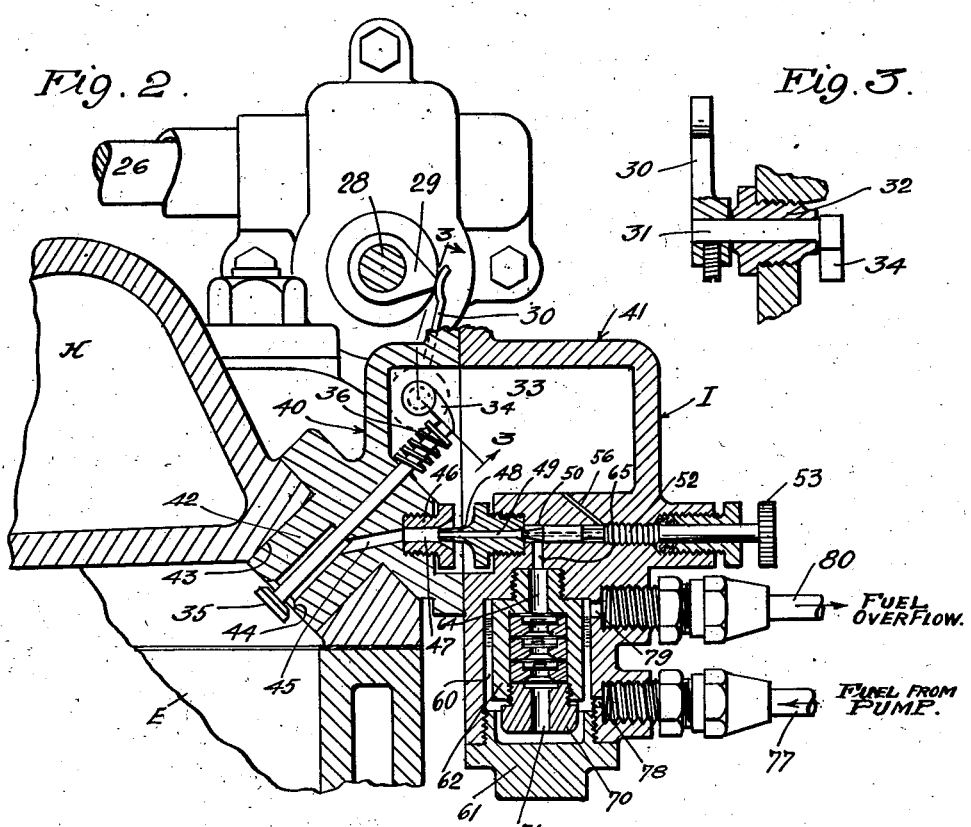
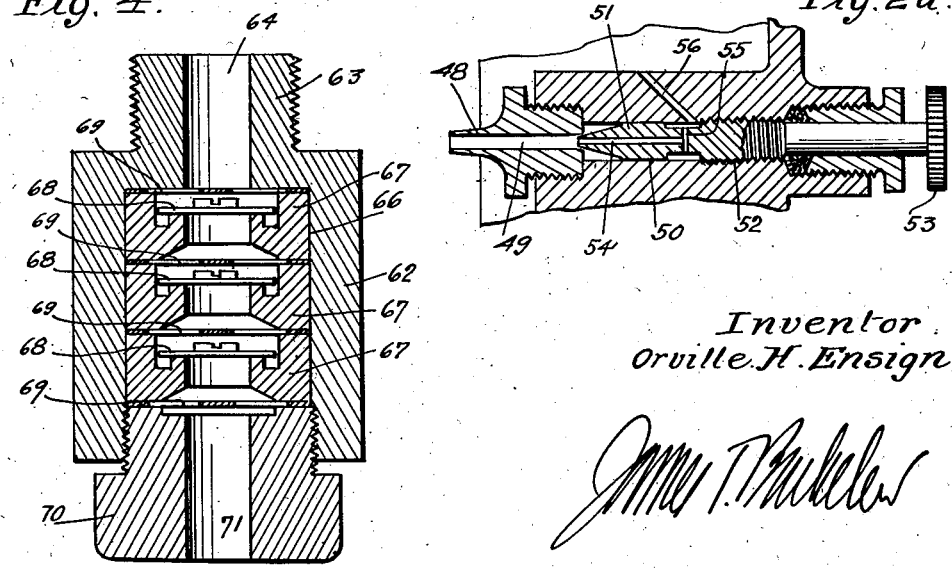

Dec. 1, 1936. O. H. ENSIGN 2,062,644
INJECTION ENGINE AND FUEL INJECTION DEVICE
Filed June 9, 1931 4 Sheets-Sheet 3

Inventor.
Orville H. Ensign.

Attorney.

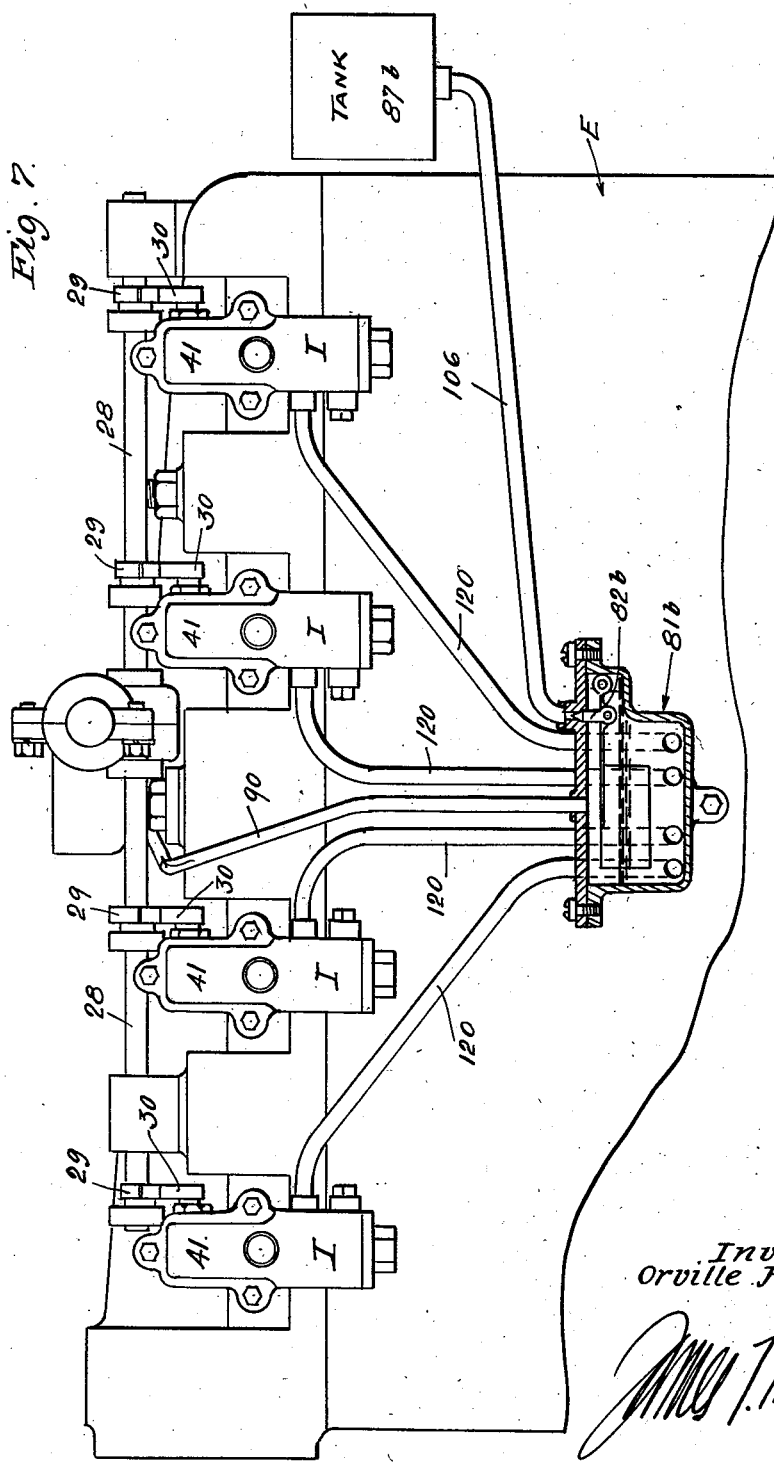

Patented Dec. 1, 1936

2,062,644

UNITED STATES PATENT OFFICE 2,062,644

INJECTION ENGINE AND FUEL INJECTION DEVICE

Orville H. Ensign, Pasadena, Calif., assignor to Ensign Carburetor Co., Ltd., Huntington Park, Calif., a corporation of California Application June 9, 1931, Serial No. 543,124

19 Claims. (Cl. 123—33)

This invention relates to injection mechanism for internal combustion engines, and also to such an engine equipped with injection mechanism.

In my prior application entitled "Art of fuel injection for internal combustion engines", Serial No. 161,513, filed January 17, 1927, renewed December 29, 1931, now issued as Patent No. 1,869,805, dated August 2, 1932, I have set out an injection mechanism which is adapted for injection of fuel in a constant volume engine. The mechanism and method therein set out include characteristically the isolation of part of a compressed charge, at suitable compression pressure and returning that part of the charge to a subsequent (preferably the next) charge, and with it the fuel necessary to make a combustible mixture of that charge. The part charge is returned to the subsequent charge at a time when the subsequent charge is at a pressure lower than the pressure at which the part charge was isolated from the previous charge. The energy represented by the drop in pressure of the part charge, upon return to the subsequent charge, is utilized for carrying the fuel into that subsequent charge. Typically, although not necessarily, the partial charge, called for brevity the injection charge, is isolated from each compressed charge at or near maximum compression; and is returned to the next subsequent charge at or near beginning of compression.

The system outlined above has many features of advantage over the carburetor system universally used for supplying constant volume engines with a combustible charge; and it is adaptable and applicable to engines of various types, including both the two-stroke cycle and four-stroke cycle and my prior kind of two-stroke cycle engine which is the subject-matter of my issued Patent No. 1,536,780, dated May 5, 1925, entitled "Automotive engine art". In the present application I show an improved form of injection mechanism applied to an ordinary type of four-stroke cycle engine, although, as will be readily understood from consideration of what follows, the present mechanism is easily adaptable to other types.

General objects of the present invention are to provide an improved injection engine, and an improved fuel injection mechanism, adapted not only to the types of engines referred to but to various other types as well, applicable to standard types of engines now in use, involving relatively few and simple parts, capable of supplying the engine wth a homogeneous combustible mixture of the fuel-and-air ratio desirable (whether fixed or varying) throughout all ranges of engine operation, and allowing the use of any fuel from high grade gasoline to heavy distillates, without any change in engine or fuel feed system.

The invention consists of certain aspects of the injection mechanism and its control of the mixtures, regardless of the type of engine; and also in certain aspects applicable particularly to, or combined with, an engine in which successive gaseous charges are compressed. The invention has peculiar utility as applied to the common type of constant volume engine in place of the carburetor ordinarily used; and is here explained in that service, but not necessarily so limited in its use.

Further features and characteristics of the invention will be better understood from the following detailed description and discussion of a preferred and illustrative structure and described in detail in the following descriptive portion of this specification, for which purposes I have reference to the accompanying drawings, in which:

Figure 1 is a more or less diagrammatic side elevation of a typical form of four-cycle engine equipped with my invention mechanism;

Fig. 2 is an enlarged detailed cross section taken on line 2—2 of Fig. 1;

Fig. 2a is a further enlargement of certain parts shown in section in Fig. 2;

Fig. 3 is a detail section taken as indicated by line 3—3 of Fig. 2;

Fig. 4 is a further enlargement of certain other parts shown in section in Fig. 2;

Fig. 7 shows another modification of fuel feed.

Figure 5:
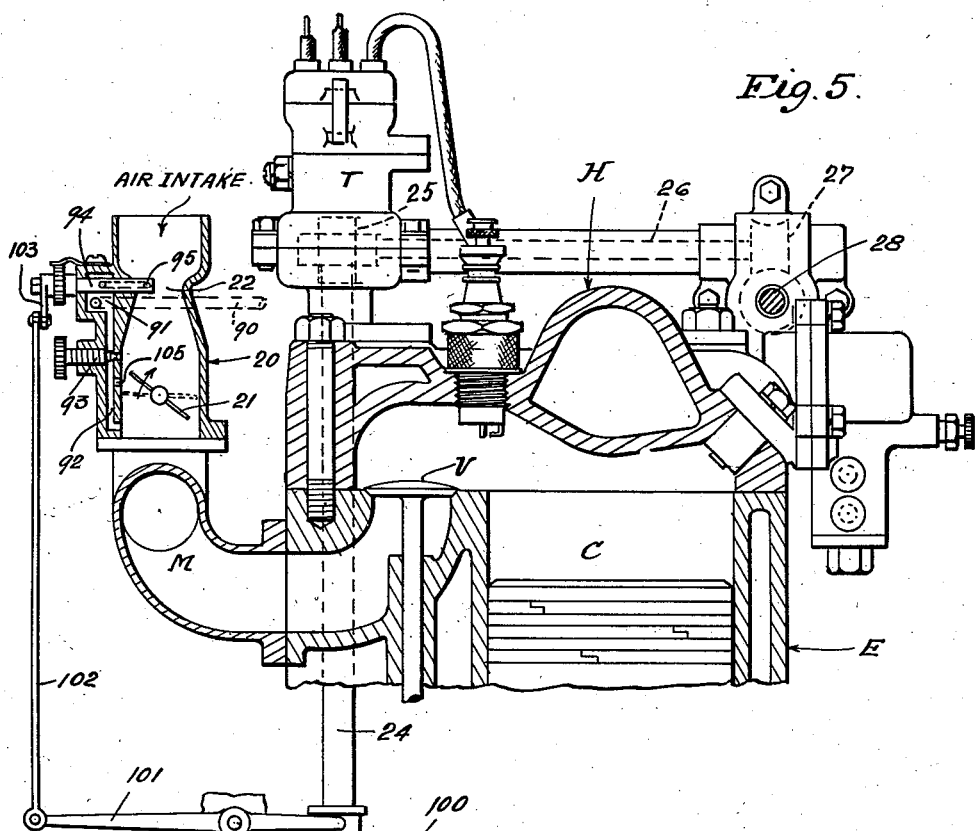
Fig. 5 is a cross section through the head of the engine, also taken on line 2—2 of Fig. 1, and showing certain parts diagrammatically.

Referring first to the general views of Figures 1 and 5, I show therein an engine E having cylinders C and head block H. The intake manifold is shown in Fig. 5 at M and an intake valve V is also shown in that figure. The exhaust valve is not illustrated but will be understood to be of the ordinary type, and the valves to be actuated in the manner usual to four-cycle engines. To the manifold M the carburetor is of course usually attached; in place of that carburetor I attach an intake tube 20 containing a throttle valve 21 and a Venturi construction 22, and other appurtenances the purpose and action of which will be described. In the typical engine here illustrated, I obtain a suitable drive for the valves involved in my injection system by raising the usual ignition timer T on the timer shaft 24 and inserting under the timer a gear set 25 to drive a cross shaft 26. This cross shaft 26 in turn drives a gear set 27 which drives a longitudinal cam shaft 28 carrying four cams 29, operating oscillating tappets 30. These four oscillating tappets are mounted on tappet shafts 31 having bearings in plugs 32 screwed through the walls of the injection charge chambers 33. Each injection charge chamber 33 with its communicating engine cylinder may together be regarded as forming a compression chamber. On the inside of each injection chamber a tappet 34 is carried on the tappet shaft 31; and this tappet 34 operates to open the corresponding injection valve 35, closed by spring 36. The action of cams 29 is thus to open and close the injection valves in those certain timed relations to piston operation that will be hereinafter described.

The injection mechanism attached to each cylinder is designated generally by the letter I. Each such mechanism comprises a suitable housing here shown as made up of two parts 40 and 41 see particularly Fig. 2. Part 40 is provided with a protruding bushing 42 projecting through opening 43 in the cylinder head, and injection valve 35 is carried in this bushing, the valve opening inwardly into the engine cylinder and seating on valve seat 44 formed on the end of bushing 42.

The other part 41 of the housing is bolted to part 40, part 40 being bolted to the head block; and the two parts 40 and 41 between them enclose the injection charge chamber 33. From this injection charge chamber the passage 45 leads to the injection valve seat 44; and at the chamber end of passage 45 is located a nozzle 46 which has through it a nozzle bore 47.

In spaced "injector" relation to nozzle bore 47 is another and smaller bored nozzle 48, whose nozzle bore 49 communicates at its rear end with a horizontal bore 50 in the housing block 41. The forward end of nozzle 48 is tapered and enters the flared rear end of nozzle bore 47 as shown. In this horizontal bore 50, see particularly Figure 2a for details, a needle valve 51 is adjustable by means of screw-threads 52 and hand wheels 53, so that the effective fuel passage through the rear end of nozzle bore 49 may be accurately regulated. The forward end of needle valve 51 is tapered and enters the rear end of nozzle bore 49 so as to obtain a fine adjustment on the effective fuel passing area at the rear end of nozzle bore 49. Needle valve 51 also has in it a longitudinal air bleeding bore 54 which communicates, via passages 55 and 56, with injection charge chamber 33. The purposes and action of this air bleeding passage will be described later. Note that, although after the first cycle of operations the charge in chamber 33 is a combustible mixture of air and fuel, the fuel injecting action of this charge is the same as if it were air. The amount of fuel carried in the injection charge mixture is a small fraction of the total amount of fuel injected. For sake of simplicity I thus refer to the injection charge as air.

To give an idea of sizes and dimensions I may say that Fig. 2 shows in full size the now preferred design which is large enough, and has sufficient adjustabilities to serve cylinders from the smallest size now in common use up to ten inches or so in diameter. In this present preferred design nozzle bore 47 is one-eighth inch; nozzle bore 49, a No. 50 drill; needle valve bore 54, a No. 70 drill; bore 56, a No. 50 drill; bore 55, a No. 60 drill; bore 65, a No. 40 drill; bore 78 a No. 75 drill.

In the housing block 41 and located below the nozzles is a constant level fuel chamber 60, closed at its lower end by plug 61. The center of this fuel chamber is occupied by a check valve holder 62, of inverted cup shape. This holder and its contained check valves are shown in larger detail in Fig. 4. The holder has at its upper end a screw-threaded nipple 63 with a vertical bore 64 which communicates directly with fuel passage 65, this fuel passage communicating with bore 50 directly behind nozzle 49. The enlarged chamber 66 of the holder 62 contains a multiple check valve, each element of which is made up of a seat member 67, a disc valve 68 and a perforated washer 69. The whole assemblage of check valve parts is held in place in the holder 62 by a screw-threaded plug 70 having a fuel passage bore 71. The purpose of the multiple check valve is to provide a very lightly opening check and one which will be practically infallible in its seating and sealing action. Although dirt or grit is at times liable to lodge on the seat of a single check valve and thus hold it open, the probability of all three of the multiple checks being thus held open is very small. This unfailing sealing action of the check valve is desirable in order to constantly hold a column of liquid standing in passages 64 and 65 up to the bore 50, for reasons hereinafter becoming apparent.

All of the fuel chambers 60 are fed with fuel from a pump 75 which delivers fuel through pipe connections 76, 77 to the fuel inlet orifices 78 leading to the several chambers 60. Each chamber 60 has an overflow outlet orifice 79 through which excess fuel flows out through pipes 80 leading to a float controlled chamber 81. Pump 75 is any suitable pump having sufficient capacity to keep the several fuel chambers 60 full to the overflow level at substantially all times. The pump is therefore one having a capacity somewhat in excess of maximum requirements, and a more or less constant overflow of fuel passes from the constant level chamber 60 to the float controlled chamber 81.

Chamber 81 has in it a float controlled valve 82 that opens when the fuel in the chamber rises above a pre-determined level, allowing fuel to flow from chamber 81 through pipe 83 to the pump intake 84. Also connected with the pump intake is a pipe 85 that, through check valve 86, leads from the fuel tank 87. Check valve 86 is closed by a spring 88 with sufficient force to keep fuel from flowing from the fuel tank in case the fuel tank should happen (as in a vehicle travelling down grade) to be somewhat above the pump. And the light spring action on this check valve also makes the pump 75 first take fuel from float controlled chamber 81, and only take from the tank 87 what is required to make up the remainder of the amount circulated by the pump.

Thus, in this system of fuel supply, it will be understood that the pump constantly circulates fuel through the constant level chambers 60 somewhat in excess of engine requirements so that, at all times (except perhaps at the instants when fuel is being moved from chambers 60 into the engine cylinders) the fuel levels in chamber 60 are maintained at the overflow point and excess fuel is returning to float controlled chamber

81. When the engine is in operation this return fuel will be warmed, and it is therefore desirable to recirculate it back to chambers 60, rather than to put this warmed fuel back into the main fuel tank and pump cold fuel to the chambers 60.

Because the fuel returned from chambers 60 is warmed, its lighter fractions may be vaporized. These vapors find exhaust from chamber 81 through connection pipe 90 to the air intake of the engine, thus utilizing the vapors rather than wasting them.

The vapor pipe 90 connects to the air intake through a chamber 91, and chamber 91 is connected to the intake, at the engine side of the throttle, by a passage 92 controlled by adjustable valve 93. Passage 92 therefore becomes a means of placing upon vapor pipe 90, and consequently upon chamber 81 and the constant level chambers 60, the varying depression existing in manifold M, controlled or moderated by the adjustment of valve 93. Chamber 91 also is provided with means for adjustably taking the Venturi depression. A rotatable rod or tube 94 has a passage 95 which, by rotary adjustment of the tube may be made to face toward the stream of air passing through the venturi, or away from the stream of air. If this opening 95 is adjusted to face toward the stream (up in Fig. 5) the pressure communicated through passage 95 to chamber 91 will be substantially atmospheric. On the other hand if it is made to face away from the air stream (downwardly in Fig. 5) a depression will be communicated to chamber 91, which depression will vary with the velocity, and therefore the volume, of air passing through the venturi. The depression thus communicable to chamber 91 from the venturi is adjustable by adjustment of tube 94, and varies in accordance with the speed of air through the intake, being highest when the greatest volume of air is being drawn into the engine in unit time.

The position of passage 95, with relation to the air stream, may be automatically adjusted by means of a governor 100, shown in Fig. 5 as attached to the timer shaft 24. Any suitable governor arrangement, of course, may be used. In Fig. 5, I show the governor operating an oscillating arm 101 which, by its movement, moves the tube 94 through the medium of a connecting link 102 and an arm 103. The governor and tube 94 are so connected up that, as the engine speed decreases the governor action turns passage 95 more and more away from the stream of air, thereby increasing the depression which is picked up at 95 and thus transmitted to the constant level chambers.

Also, to provide an economizer action, I provide a port 105 connecting with passage 92 and lying in such position with reference to throttle 21 as to be on the intake side of the throttle when it is closed and to be uncovered by the throttle as the throttle opens past the idling position. For instance in the throttle position shown in full lines in Fig. 5 the throttle edge has passed port 105 and that port is more or less subjected to the manifold depression. In a position less widely open where the throttle has just passed port 105, this depression on the port is the greatest; and as the throttle passes on toward wider positions, this depression gradually disappears. The action is, as far as application of depressions is concerned, essentially the same as that described in my Patent No. 1,799,585 dated April 7, 1931, Carburetor.

Figure 6:
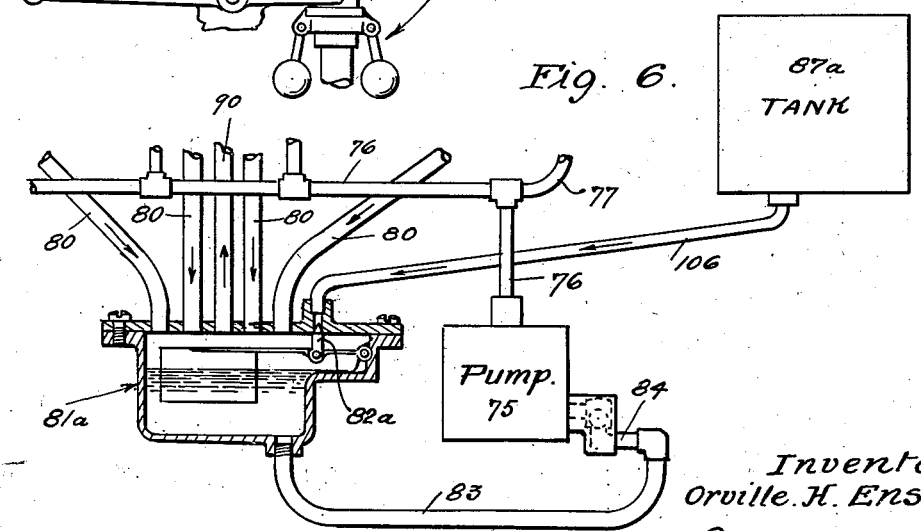
Fig. 6 is a diagram showing a modified arrangement of the fuel distributing system shown in Fig. 1.

Figure 6 shows a slightly modified form of fuel supply system, where the tank 87a is at all times above the float control chamber 81a. Here the float controlled valve 82a opens when the fuel falls below a predetermined level, admitting fuel through pipe 106 directly from tank 87a. The pump 75 takes its fuel through pipe 83 only from float control chamber 81a; and float controlled valve 82a opens to admit fuel from tank 87a only as fuel is required in the system to supply that which has actually been used by the engine.

Assuming that suitable liquid fuel is being constantly maintained in the constant level chambers 60, as before described, the operation of the injection system is as follows:

In the four cycle engine here illustrated, the upward compression stroke of the piston is, of course, preceded by a downward intake stroke. In a two cycle engine the upward compression stroke is immediately preceded by a downward expansion stroke at the end of which exhaust takes place, and intake then is accomplished at the bottom of the stroke. The description of operation which I now give will be seen to be applicable equally well to all types, including both four-cycle and two-cycle engines, as the only requirement is that the engine shall compress successive charges, and it is of no consequence whether the charge is compressed in a work cylinder or elsewhere, and whether the compression stroke follows an intake stroke. The mechanism as described may be applied to the ordinary two-cycle engine without change, and to all types of internal combustion engines with minor adaptations.

Assuming that the piston is starting on its upper compression stroke, having previously drawn in a charge of air, injection valve 35 is opened by the operation of cam 29, at or near the beginning of the compression stroke, when the air pressure in the cylinder is either substantially atmospheric or sub-atmospheric, depending upon the degree to which the throttle 21 is open. The piston proceeds on its upward compression stroke, valve 35 remaining open until near the top of the stroke—until just before ignition takes place; and, as a result, an injection charge at substantially maximum compression pressure enters chamber 33 and is then isolated by the closing of valve 35.

In starting the engine, the first compressed charge in each cylinder will, of course, be pure air, and the first isolated injection charge in chamber 33 will be pure air. In subsequent operation these charges, as will be understood from what follows, are combustible mixtures; but at the start the engine must be turned over by the starter through one complete cycle. The engine thus turns over until the piston is at the beginning of the next compression stroke, valve 35 having in the meantime remained closed and the injection charge in chamber 33 having been retained at pressure. At or near the beginning of the compression stroke valve 35 again opens, and the following action then takes place.

The injection charge, under its pressure (and under the additional effective pressure created by whatever depression may at the time obtain in the cylinder as hereinafter explained) passes out through nozzle bore 47 at high velocity. In so doing it creates a depression in nozzle bore 49 and in the fuel feed bore 50. After the first operation for each cylinder the liquid fuel stands above the check valve to the top of passage 65, so the fuel injecting operation will be described as if that is always the case. It is desirable that the fuel stand close to the injection nozzle, to make the fuel start movement quickly. The depression created in bore 49 above the fuel draws fuel up through passages 65 and 64 past the check valves from the constant level chamber 60. That fuel is drawn out through nozzle bore 49 and, mixed and entrained with the air or gaseous charge passing through nozzle bore 47, is thrown at high velocity through that nozzle bore and through passage 45 and past the valve 35 into the cylinder. The velocity is such as to cause thorough atomization and distribution of the fuel and admixture in the injection stream; and such as to cause thorough admixture of the injection stream and fuel with the air charge in the cylinder.

In order to facilitate speed of fuel delivery, thorough atomization and admixture of the liquid fuel, the small air bleed port 56 allows some of the injection charge from chamber 33 to pass, via needle passages 54 and 55, into the fuel stream at the point where it enters nozzle bore 49, admixing at that point with the fuel stream and facilitating its forward movement, atomization and admixture with the main air stream.

The force which lifts the fuel and draws it through nozzle bore 49 is the relative depression created by injector action in nozzle 49 and in bore 50; that is the depression relative to the pressure at the time obtaining in chamber 33. This force, even at the minimum compression pressures when the engine is idling or running under light load, is in this device, and even when reduced by the air bleed through the needle valve, much more than is requisite to raise the fuel through the necessary height. A primary control for the flow of fuel is therefore provided in the adjustability of needle valve 51, by which the orifice at the rear end of nozzle bore 49 may be cut down as much as necessary. Such adjustment of needle valve 51 reduces the fuel flow into nozzle bore 49, but does not reduce the relative depression in that nozzle bore. Consequently, the lifting of fuel from the constant level chamber 60 may thus be regulated so that substantially the correct amount of fuel will be lifted into nozzle bore 49; but the maximum depression in nozzle bore 49 (for any given compression pressure in chamber 33) remains substantially unaffected by adjustment of needle 51; and thus, as soon as the fuel has been drawn into the rear end of nozzle bore 49 it is immediately subjected to the whole depression, which immediately acts to set the fuel in high speed motion forward, tends to expand and vaporize it, and thoroughly to admix it with the air passing through both nozzles. The same depression force in bore 50 which lifts the fuel also draws in air through bleed port 56, which air is therefore drawn in substantially proportionately to the amount of fuel lifted.

I have assumed that the fuel pump capacity may be sufficient to keep fuel at all times at the maximum level in constant level chambers 60. That is, however, not necessary. It is only necessary that the fuel pump be of such capacity as to always present fuel at the maximum or a constant level in that chamber at the beginning of the fuel inspiration action. The fuel level may drop somewhat during actual fuel inspiration, depending upon the relation between the inspiration rate and the pumping rate. And such difference may be utilized to some degree in controlling the amount of fuel lifted; as it will be apparent that, if the fuel level in chamber 60 falls somewhat during inspiration, the amount of fuel lifted by a given depression force in bore 50 will be somewhat reduced.

Generally speaking, the amount of fuel lifted and inspired into the injection air stream varies with the pressure in chamber 33, which in turn varies directly with the volume of charge which has previously been compressed in the cylinder. The amount of fuel inspired at each action therefore varies generally with the volume of air in the cylinder charge; but this last statement must be modified by several other considerations.

First, there is the consideration that, as the total effective injector operating pressure increases, the tendency is to inspire proportionately more fuel. This tendency, considered by itself, would make the cylinder mixtures richer at wide open throttle and full compression, than at closed throttle and low compression. However, it will immediately be recognized that the effective injector operating pressure consists not solely of the pressure isolated in chamber 33 but of that pressure (measured above atmosphere) plus the depression which exists in the cylinder at the time injection valve 35 is opened at or near the beginning of the compression stroke. While the pressure above atmosphere in chamber 33 will vary substantially in proportion to the volume of air compressed in the cylinder, the depression in the cylinder varies in inverse ratio to the volume being compressed; and consequently the total of these two pressures, which is the total effective pressure, will, in ratio, increase in proportion to the volume of air compressed as the throttle is closed down and compression pressures become lower.

This last mentioned factor causes such relative increase of the total effective injector operating pressure as to more than overcome the first mentioned factor and, therefore, to cause richer mixtures than desirable at low power operation of the engine. On any injection engine of the type here described, it is not necessary, as it is in a carburetor engine where at low operation the fuel tends to drop out in the manifold, to supply a much richer mixture at low power operation. It is desirable to supply a slightly relatively richer mixture at low power operation and to supply a relatively leaner mixture at medium power operation, for purposes of economy. But the factor last mentioned has a tendency to vary the relative mixtures at low and high power operation much more than is desired, and consequently must be regulated and offset.

Such regulation and offsetting may be accomplished in a variety of manners. For instance, injection valve 35 may be initially opened, not so close to the beginning of the compression stroke, but at a time when the intake valve closes or when the piston is part way up on its compression stroke and the cylinder pressure has become somewhat higher. The pressure, at any given point in the compression stroke, will of course vary; but at a point part way up the compression stroke will not vary below atmosphere so much as at the beginning of the compression stroke. By thus taking advantage of pressure variations that may be obtained by adjustment of the timing of valve 35, the remaining adjustments and controls may be effected as will now be described.

I have shown constant level chamber 60, via connecting pipes 80, chamber 81, and connecting pipe 90, may be subjected to depressions obtained at the air intake; provision being made at the passage 92 to subject the constant level chambers to modified manifold depression, and provision being made at 95 to subject chambers to modified depression created by air steam velocity. As throttle 21 is closed, and the cylinder takes a lesser volume of air for compression, the manifold depression inside the throttle consonantly increases; and that varying depression, communicated through passage 92 to the constant level chambers above the fuel, proportionately decreases the effective fuel feed pressure available for feeding fuel up through passage 65 to the nozzle. Such provision for thus applying manifold depression thus becomes a means of relatively decreasing the amount of fuel lifted, in proportion to the total effective nozzle operating pressure, and thus regulates and offsets the tendency of that effective nozzle operating pressure to feed too much fuel at low power operation.

Additionally, the passage 95 may be so set with general relation to the inflowing air stream as to obtain at 95 and therefore on the constant level chambers, another depression which varies, within regulatable limits, directly as the amount of air being drawn into the cylinders. Proper adjustment of the two described controls, and their superposition in effect on the constant level chambers, will therefore apply to those chambers a final varying depression which regulates closely the proportionate amounts of fuel inspired at all the varying power operations of the engine.

The factor of engine speed remains yet to be discussed. Everything else being equal, it will be readily understood how at high speed less of the charge will enter chamber 33 and likewise less of that isolated injection charge, together with fuel, will be returned to the cylinder. The time factor for transfer of air and fuel is proportionately less as the speed increases. Thus, engine speed alone tends to make a relatively thinner mixture at high speed and a relatively richer mixture at low speed. The governor control of depression passage 95 takes care of that tendency. The relation between passage 95 and the governor (position of passage 95 at any given engine speed) may, of course, be adjusted. Such an adjustment is indicated in Fig. 5 by the adjustment of arm 103 effected by loosening the lock screw in the end thereof. Having once been adjusted, then, as the engine speed decreases, passage 95 is turned to pick up relatively more and more depression, thus relatively increasing the depression on the constant level chambers at lower speeds and thus relatively decreasing the amount of fuel carried into the cylinders at those lower speeds.

The action of the economizer port 105 will be readily understood from what I have said before. As the throttle is opened past idling position it is usually desirable, for sake of economy, to relatively thin the mixture below the slightly rich or perfect mixture desirable at idling. The depression picked up at such incipient opening positions of the throttle by port 105 is communicated to the constant level chambers, and effects the purpose of thinning the mixture substantially immediately after the throttle has been opened past idling position; so that throughout the range of middle powers the engine is running on a relatively thin mixture. The action of the economizer port, however, is such that, as the throttle opens more and more widely the depression applied at port 105 decreases until, at or near wide open throttle, the effect of port 105 has substantially vanished. The action of port 105, through its depression placed on the constant level chamber is thus to thin the mixture at medium power operation and to gradually allow that mixture to approach the desirable perfect combustibility at full power operation.

Fig. 7 shows a further modified form of the fuel feeding system for providing constant level chambers 60 with their fuel; a system in which the fuel is fed to those constant level chambers by utilizing the depression caused in the chambers by the injector action. In this case, the same depression or suction which raises fuel through the fuel orifices 65 (modified somewhat by the depressions obtained at the engine intake) also raises the fuel into the constant level chambers. This depression I find is sufficient to raise the fuel through a considerable vertical distance; so that the fuel can thus be raised without the necessity of a pump from a tank or a float chamber placed near the engine.

In the case of a stationary engine the fuel may be thus lifted directly from the fuel supply tank; but in engines subject to movement and displacement, such as in automobiles or airplanes, or where it is desirable to have the supply tank at some distance from the engine, it is desirable as in the other fuel feed systems heretofore described to utilize the float chamber situated close to the engine and in such relation thereto that inclination does not materially affect the height through which the fuel is raised. Thus in Fig. 7, I show the chamber 81b having the float controlled valve 82b which admits fuel from tank 87b whenever fuel in the chamber falls below a predetermined level. From this float chamber the pipes 120 run directly to the upper fuel orifices 79 of the several constant level chambers, the lower fuel orifices 78 being in this case not used. I prefer to use individual pipes or tubes 120 to each chamber, instead of a manifold arrangement of pipes, because any air bubble or particle of foreign matter which may by any possibility get into one of the pipes will not affect fuel feed to any of the other constant level chambers.

The operation of this form of fuel feed will be readily understood from this description. The depression at present in each constant level chamber 60, at the time of injection into the engine cylinder when fuel is being raised through the check valves, is, although modified by the depression taken from the engine intake, ample and sufficient to raise fuel from the float chamber to the constant level chambers to fill them. Thus, at each injection action, each constant level chamber is filled, ready for the next injection action.

It will be understood that the fuel feed system shown in Fig. 7 and above described may be substituted for either of the fuel feed systems before described, to act in combination with all the various features of the whole fuel injection system.

I claim:

1. In a gas pressure operated injection mechanism having a charge chamber adapted to receive the gas under pressure, a delivery nozzle communicating with said chamber, a fuel inspiring nozzle in injector relation to the delivery nozzle, a constant level fuel chamber, and means for supplying said chamber with fuel; a check valve holder situated centrally in the constant level chamber and having a vertical central passage therethrough, a passage connecting the holder passage with the fuel inspiring nozzle, and a multiple check valve contained within the check valve holder.

2. In a gas pressure operated injection mechanism having a charge chamber adapted to receive the gas under pressure, a delivery nozzle communicating with said chamber, a fuel inspiring nozzle in injector relation to the delivery nozzle, a constant level fuel chamber, and means for supplying said chamber with fuel; a check valve holder situated centrally in the constant level chamber and having a vertical central passage therethrough, a passage connecting the holder passage with the fuel inspiring nozzle, and a multiple check valve contained within the check valve holder, said multiple check valve comprising a series of units, each of which includes a valve seat, a thin disc valve, and a perforated gasket.

3. A fuel supply system for an internal combustion engine, comprising a fuel chamber having a fuel inlet and an overflow fuel outlet, means for moving fuel from said chamber to the engine cylinder including means for applying suction to the fuel in the chamber to draw fuel therefrom, a float chamber below the fuel chamber, connection between the fuel chamber inlet and the float chamber below the fuel level therein, means for feeding fuel from said float chamber to the fuel chamber, connection between the overflow outlet and the float chamber above the fuel level therein, a float controlled inlet valve in the float chamber, and a fuel supply line leading to the float chamber controlled by said float valve.

4. A fuel supply system for an internal combustion engine, comprising a constant level fuel chamber having an inlet orifice and an overflow outlet, a cylinder, walls forming a compression chamber communicable with said cylinder, means actuated by the pressure of an air charge compressed into said compression chamber to lift fuel from the constant level chamber and forcibly inject it into the engine cylinder in quantity proportionate to the pressure of the compressed air charge, fuel circulatory means embodying a fuel pump supplying fuel to said constant level chamber, a fuel overflow chamber connected to said pump and receiving fuel from the constant level chamber, and a fuel tank connected to the suction side of said pump to supply fuel thereto.

5. A fuel supply system for an internal combustion engine, comprising a constant level fuel chamber having an inlet orifice and an overflow outlet, a cylinder, walls forming a compression chamber communicable with said cylinder, means actuated by the pressure of an air charge compressed into said compression chamber to lift fuel from the constant level chamber and forcibly inject it into the engine cylinder in quantity proportionate to the pressure of the compressed air charge, fuel circulatory means embodying a fuel pump supplying fuel to said constant level chamber, a fuel overflow chamber connected to said pump and receiving fuel from the constant level chamber, and a fuel tank connected into the fuel circulatory means to supply fuel thereto, the connection of the tank to the circulatory means including a check valve which opens to permit fuel flow into the circulatory means only when there is a deficiency of fuel therein 6. A fuel supply system for an internal combustion engine, comprising a constant level fuel chamber having an inlet orifice and an overflow outlet, a cylinder, walls forming a compression chamber communicable with said cylinder, means actuated by the pressure of an air charge compressed into said compression chamber to lift fuel from the constant level chamber and forcibly inject it into the engine cylinder in quantity proportionate to the pressure of the compressed air charge, fuel circulatory means embodying a fuel pump supplying fuel to said constant level chamber, a fuel overflow chamber connected to said pump and receiving fuel from the constant level chamber, and a fuel tank connected into the fuel circulatory means between the fuel receiving chamber and the pump, said tank connection including a spring closed check valve adapted to open against its spring to supply fuel to the circulatory means.

7. A fuel supply system for an internal combustion engine, comprising a constant level fuel chamber having an inlet orifice and an overflow outlet, a cylinder, walls forming a compression chamber communicable with said cylinder, means actuated by the pressure of an air charge compressed into said compression chamber to lift fuel from the constant level chamber and forcibly inject it into the engine cylinder in quantity proportionate to the pressure of the compressed air charge, fuel circulatory means embodying a fuel pump supplying fuel to said constant level chamber, a fuel receiving overflow chamber connected to said pump and receiving fuel from the constant level chamber, a float controlled inlet valve in the fuel receiving chamber, and a fuel supply tank connected to the fuel receiving chamber, the flow of fuel from said tank to the last mentioned chamber being controlled by said inlet valve.

8. In combination, a cylinder, walls forming a compression chamber communicable with said cylinder, an air intake including means for producing a depression by the velocity of air flow therein, and means compressing gaseous charges into said chamber; a constant level liquid fuel chamber and means for feeding fuel thereto, means actuated by pressure of a gaseous charge that has been compressed into said compression chamber, to move liquid fuel from the constant level chamber into the cylinder in amount proportionate to the pressure of such compressed charge, and means for decreasing said amount of fuel in proportion to the pressure of said compressed charge, by virtue of increased velocity depression obtaining in the engine intake.

9. In combination, a cylinder, walls forming a compression chamber communicable with said cylinder, a throttle controlled intake including means for producing a depression by the velocity of air flow therein, and means for compressing gaseous charges into said chamber; a constant level liquid fuel chamber and means for feeding fuel thereto, means actuated by pressure of a gaseous charge that has been compressed into said compression chamber, to move liquid fuel from the constant level chamber into the cylinder in amount proportionate to the pressure of such compressed charge, and means for decreasing said amount of fuel in proportion to the pressure of said compressed charge, by virtue of increased depression obtaining in the engine intake at a point inside the control throttle.

10. In combination, a cylinder, walls forming a compression chamber communicable with said cylinder, an air intake including means for producing a depression by the velocity of air flow therein, and means for compressing gaseous charges into said chamber; a constant level liquid fuel chamber and means for feeding fuel thereto, means including a gas operated injector actuated by pressure of a gaseous charge that has been compressed into said compression chamber, to move liquid fuel from the constant level chamber into the cylinder in amount proportionate to the pressure of such compressed charge, and means for decreasing said amount of fuel in proportion to the pressure of said compressed charge, by virtue of increased speed of engine operation.

11. In combination, a cylinder, walls forming a compression chamber communicable with said cylinder, a throttle controlled intake including means for producing a depression by the velocity of air flow therein, and means for compressing gaseous charges into said chamber; a constant level liquid fuel chamber and means for feeding fuel thereto, means actuated by pressure of a gaseous charge that has been compressed into said compression chamber, to move liquid fuel from the constant level chamber into the cylinder in amount proportionate to the pressure of such compressed charge, and means for decreasing said amount of fuel in proportion to the pressure of said compressed charge, by virtue of increasing velocity depression obtaining in the engine intake and increasing depression in the engine intake inside the control throttle.

12. In combination, a cylinder, walls forming a compression chamber communicable with said cylinder, a throttle controlled intake including means for producing a depression by the velocity of air flow therein, and means for compressing gaseous charges into said chamber; a constant level liquid fuel chamber and means for feeding fuel thereto, means including a gas operated injector actuated by pressure of a gaseous charge that has been compressed into said compression chamber, to move liquid fuel from the constant level chamber into the cylinder in amount proportionate to the pressure of such compressed charge, and means for decreasing said amount of fuel in proportion to the pressure of said compressed charge, by virtue of increasing velocity depression obtaining in the engine intake, and increasing depression in the engine intake inside the control throttle.

13. In combination, a cylinder, walls forming a compression chamber communicable with said cylinder, an air intake including means for producing a depression by the velocity of air flow therein, and means for compressing gaseous charges into said chamber; a constant level liquid fuel chamber and means for feeding a fuel thereto, means actuated by pressure of a gaseous charge that has been compressed into said compression chamber, to move liquid fuel from the constant level chamber into the cylinder in amount proportionate to the pressure of such compressed charge, and means for decreasing said amount of fuel in proportion to the pressure of said compressed charge, by virtue of increasing velocity depression obtaining in the engine intake and increasing speed of engine operation.

14. In combination, a cylinder, walls forming a compression chamber communicable with said cylinder, an air intake including means for producing a depression by the velocity of air flow therein, and means for compressing gaseous charges into said chamber; a constant level liquid fuel chamber and means for feeding fuel thereto, means actuated by pressure of a gaseous charge that has been compressed into said compression chamber, to move liquid fuel from the constant level chamber into the cylinder in amount proportionate to the pressure of such compressed charge, and means for decreasing said amount of fuel in proportion to the pressure of said compressed charge, as the velocity depression in said air intake increases the last mentioned means including a passage connecting the fuel chamber with said intake.

15. In combination, a cylinder, walls forming a compression chamber communicable with said cylinder, an air intake including means for producing a depression by the velocity of air flow therein, and means for compressing gaseous charges into said chamber; a constant level liquid fuel chamber and means for feeding fuel thereto, means actuated by pressure of a gaseous charge that has been compressed into said compression chamber, to move liquid fuel from the constant level chamber into the cylinder in amount proportionate to the pressure of such compressed charge, and means for decreasing said amount of fuel in proportion to the pressure of said compressed charge, as the velocity depression in said air intake increases the last mentioned means including a passage connecting the fuel chamber with said intake, and means for controlling the depression communicated through said passage to the fuel chamber.

16. In combination, a cylinder, walls forming a compression chamber communicable with said cylinder, a throttle controlled intake including means for producing a depression by the velocity of air flow therein, and means for compressing gaseous charges into said chamber, a constant level liquid fuel chamber and means for feeding fuel thereto, means actuated by pressure of a gaseous charge that has been compressed into said compression chamber, to move liquid fuel from the constant level chamber into the cylinder in amount proportionate to the pressure of such compressed charge, and means for decreasing said amount of fuel in proportion to the pressure of said compressed charge, as the depression in said intake inside the throttle decreases, the last mentioned means including a passage connecting the fuel chamber with the intake at a point inside the throttle to communicate the varying depression caused by throttle control of the intake.

17. In combination, a cylinder, walls forming a compression chamber communicable with said cylinder, an air intake including means for producing a depression by the velocity or air flow therein, and means for compressing gaseous charges into said chamber; a constant level liquid fuel chamber and means for feeding fuel thereto, means actuated by pressure of a gaseous charge that has been compressed into said compression chamber, to move liquid fuel from the constant level chamber into the cylinder in amount proportionate to the pressure of such compressed charge, and means for decreasing said amount of fuel in proportion to the pressure of said compressed charge, as the velocity depression in said air intake increases, the last mentioned means including a passage connecting the fuel chamber with the intake to communicate the velocity depression therein to the fuel chamber, and governor means actuated by virtue of engine speed and including a mechanism operating to vary the velocity depression communicated from said intake to the fuel chamber.

18. In combination, a cylinder, walls forming a compression chamber, a throttle controlled intake including means for producing a depression by the velocity of air flow therein, and means for compressing gaseous charges into said chamber; a constant level liquid fuel chamber and means for feeding fuel thereto, means actuated by pressure of a gaseous charge that has been compressed into said compression chamber, to move liquid fuel from the constant level chamber into the cylinder in amount proportionate to the pressure of such compressed charge, and means for decreasing said amount of fuel in proportion to the pressure of said compressed charge, as the depression in said intake increases, the last mentioned means including a passage connecting the fuel chamber with the intake outside the throttle to communicate to the fuel chamber the velocity depression therein, and also connecting with the engine intake inside the throttle to communicate to the fuel chamber the varying depression caused by throttle control.

19. In combination with walls forming a compression chamber, a work cylinder, a throttle controlled intake including means for producing a depression by the velocity of air flow therein, and means for compressing gaseous charges into said chamber; a constant level liquid fuel chamber and means for feeding fuel thereto, means actuated by pressure of a gaseous charge that has been compressed into said compression chamber, to move liquid fuel from the constant level chamber into the work cylinder in amount proportionate to the pressure of such compressed charge, and means for decreasing said amount of fuel in proportion to the pressure of said compressed charge, as the depression in said intake increases, the last mentioned means including a passage connecting the fuel chamber with the intake outside the throttle to communicate to the fuel chamber the velocity depression therein, and also connecting with the engine intake inside the throttle to communicate to the fuel chamber the varying depression caused by throttle control, and governor means actuated by virtue of engine speed and including a mechanism operating to vary the velocity depression communicated through said passage to the fuel chamber.

ORVILLE H. ENSIGN.